United States Patent [19]
Chen

[11] Patent Number: 5,581,312
[45] Date of Patent: Dec. 3, 1996

[54] PAD BRIDGE FRAME OF SPECTACLES

[75] Inventor: Tsai-Ming Chen, Hsin-Chu Hsien, Taiwan

[73] Assignee: Gazelle Corporation, Taipei, Taiwan

[21] Appl. No.: 649,331

[22] Filed: May 21, 1996

[51] Int. Cl.⁶ .............................. G02C 5/12; G02C 1/00
[52] U.S. Cl. .............................. 351/138; 351/78; 351/80; 351/136
[58] Field of Search .................................. 351/138, 136, 351/78, 80, 65, 69, 70, 71, 72, 76, 79, 81, 137, 139, 41

[56] References Cited

FOREIGN PATENT DOCUMENTS 58-181016  10/1983  Japan ........................... 351/138

Primary Examiner—Hung Dang
Attorney, Agent, or Firm—Morton J. Rosenberg; David I. Klein

[57] ABSTRACT

The present invention provides a pad bridge frame of spectacles that includes two joint brackets extending downwardly and outwardly from the bridge of the spectacle frame having a circular recess in the middle portion, respectively. The pad bridge includes a pair of strip blocks and a tie portion connecting the pair strip blocks together. Each pad bridge has a passage along the axis having a bulged circular ring within the passage adapted to be inserted into the recess of the joint bracket while the pad bridge sleeves on the joint bracket for securing purpose.

2 Claims, 5 Drawing Sheets

PAD BRIDGE FRAME OF SPECTACLES

BACKGROUND OF THE INVENTION

1. Field of the Invention

The present invention relates to a pad bridge frame of spectacles, and more particularly to a combined frame that can be mounted easily and stably to prevent the spectacle from sliding off the wearer's nose.

2. Background of the Prior Art

The conventional plastic spectacle frames are mostly catagorized in two types, one of which is to form a pad bridge frame under the bridge of the frame with the whole frame integrally formed. The material is generally made from hard plastic which causes uncomfortable feeling to the wearer and leaving a mark on the nose. Owing to this, some spectacles had adapted soft pad bridges on the frame by sticking on. But the afixability is unstable which causes the pad bridges to fall apart easily when the pad bridges get wet.

Another design was developed which, as shown in FIG. 5, is a sun glasses A and is used mostly in sports and for recreational purposes. The sun glasses A has a bracket B contoured as an ordinary one with a plurality of pins B1 on the inner portion of the bracket for fitting with sockets C1 of a pad bridge C. But the connection depends merely upon the tightness of the pins B1 and the sockets C1, the pad bridge C still can not be secured on the bracket B firmly.

In general, applying one glue coating on the surface of each is able to prevent pads from falling down, but the pad bridge C must be disassembled when it is necessary to be replaced. Thereby this pad bridge frame of joint can not give consideration to the needs of easy installing and replacing.

OBJECT OF THE INVENTION

A main object of the present invention is to provide a renovated pad bridge frame which can slide the soft pad bridge on the spectacle frame directly and stably, and is easy to replace.

The present invention includes two joint brackets extending downwardly from the bridge of the spectacle frame with a circular recess in the middle respectively, and the pad bridge is a pair of separated strip blocks or with a tie portion connecting them together, along the long axis of the pad bridge there is a through groove and a neck-in hole at the middle for socketing on the circular recess of the joint bracket to mount a spectacles.

DETAILED DESCRIPTION OF THE PREFERRED EMBODIMENTS

Figure 1:
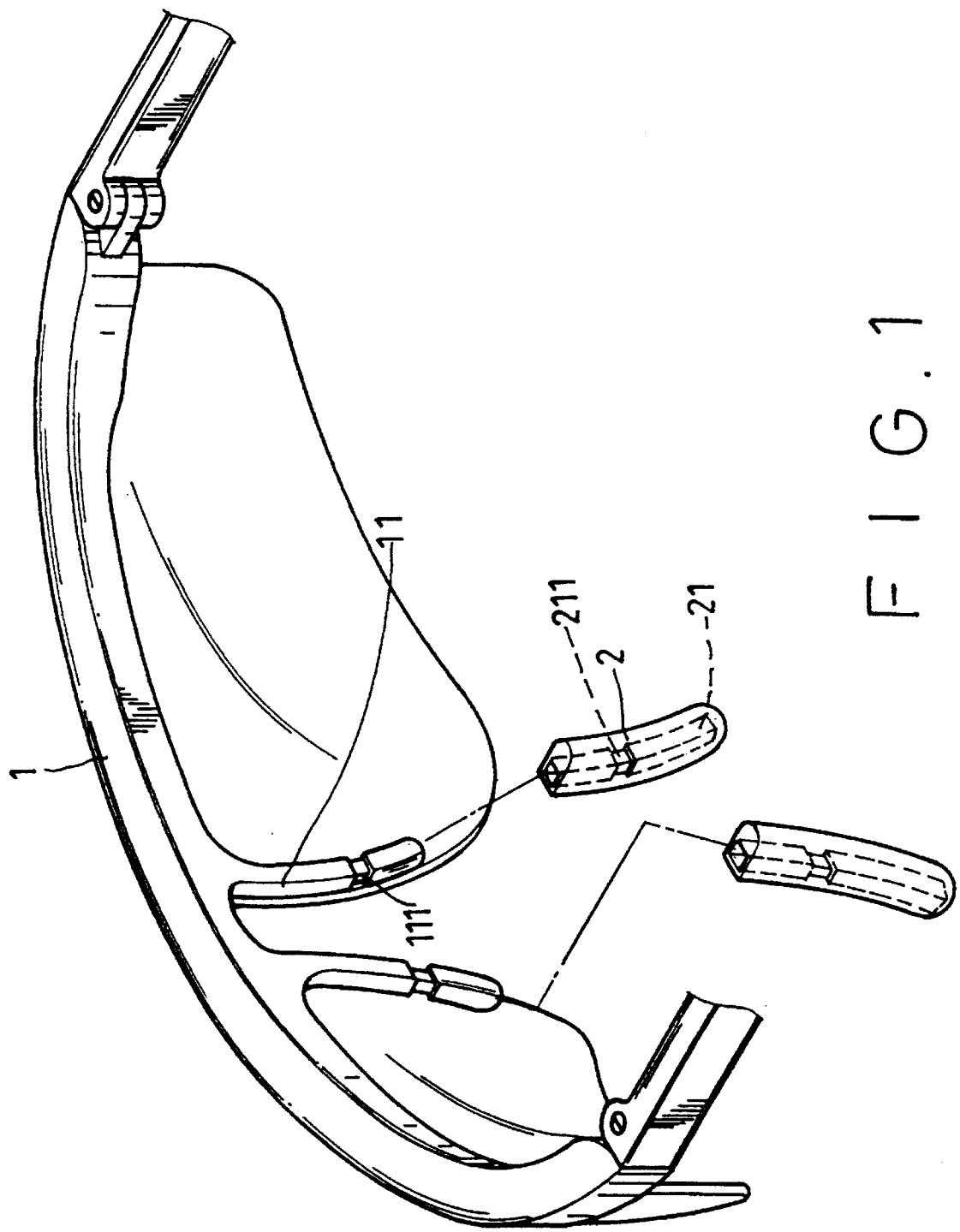
FIG. 1 is an exploded view of an spectacles having incorporated with a pad bridge frame of the present invention.

Referring to FIG. 1, the present invention includes a spectacle frame 1 and a pair of identical pad bridges 2.

The spectacle frame 1 comprises a pair of joint brackets 11 extending downwardly and outwardly from respective sides of the bridge, which are shaped to fit the shape of a human's nose, and a circular recess 111 formed on each bracket.

Each pad bridge 2 is made of soft plastic material into a strip block shape. Each pad bridge 2 has a passage 21 along the axis and a bulged circular ring 211 formed within the passage 21 which has a smaller diameter than that of the passage 21.

Figure 2:
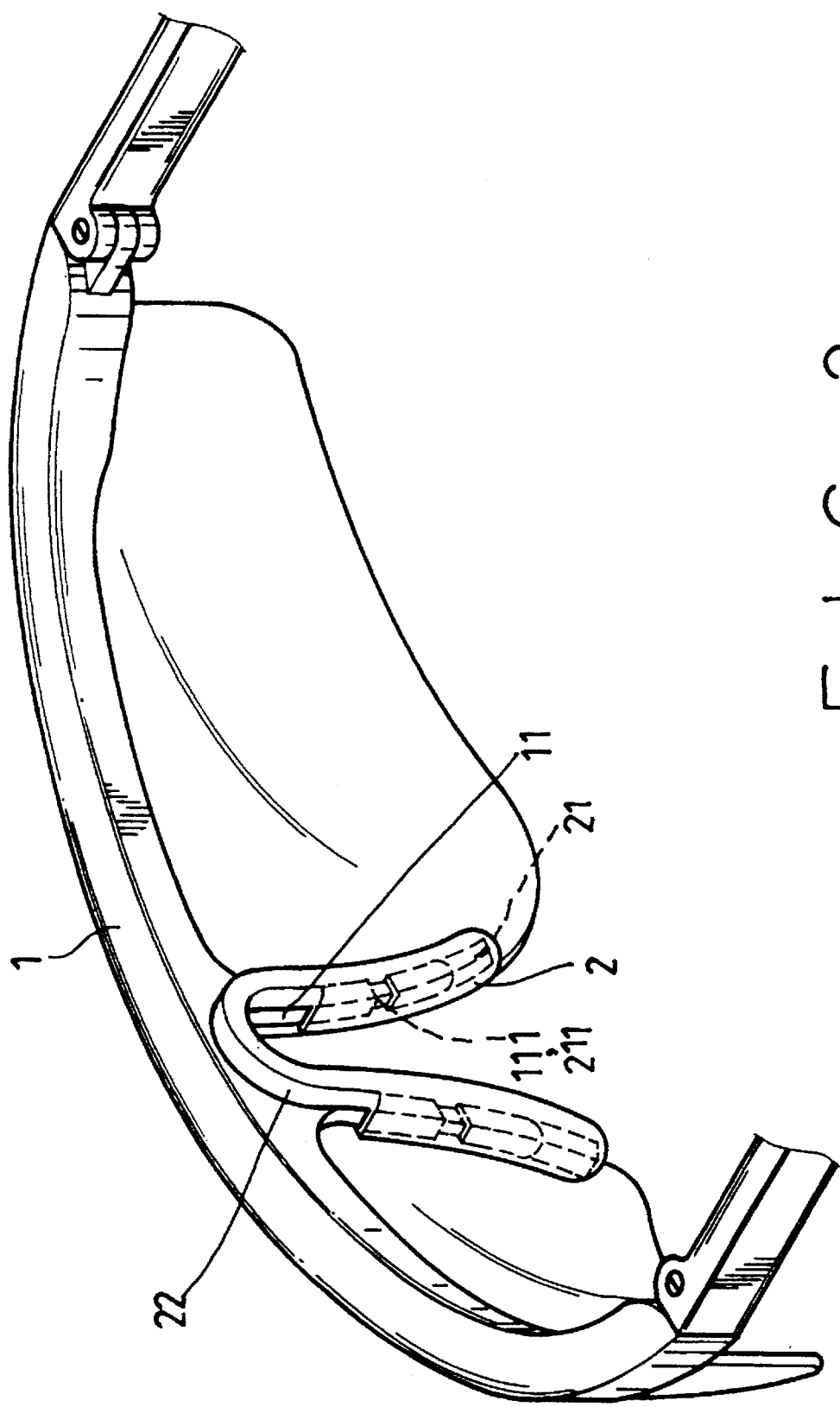
FIG. 2 is a perspective view showing a second embodiment of the present invention.

The pad bridges 2 may be designed to form a tie portion 22, as shown in FIG. 2, for connecting the two strip blocks to form a whole piece in appearance.

Figure 3:
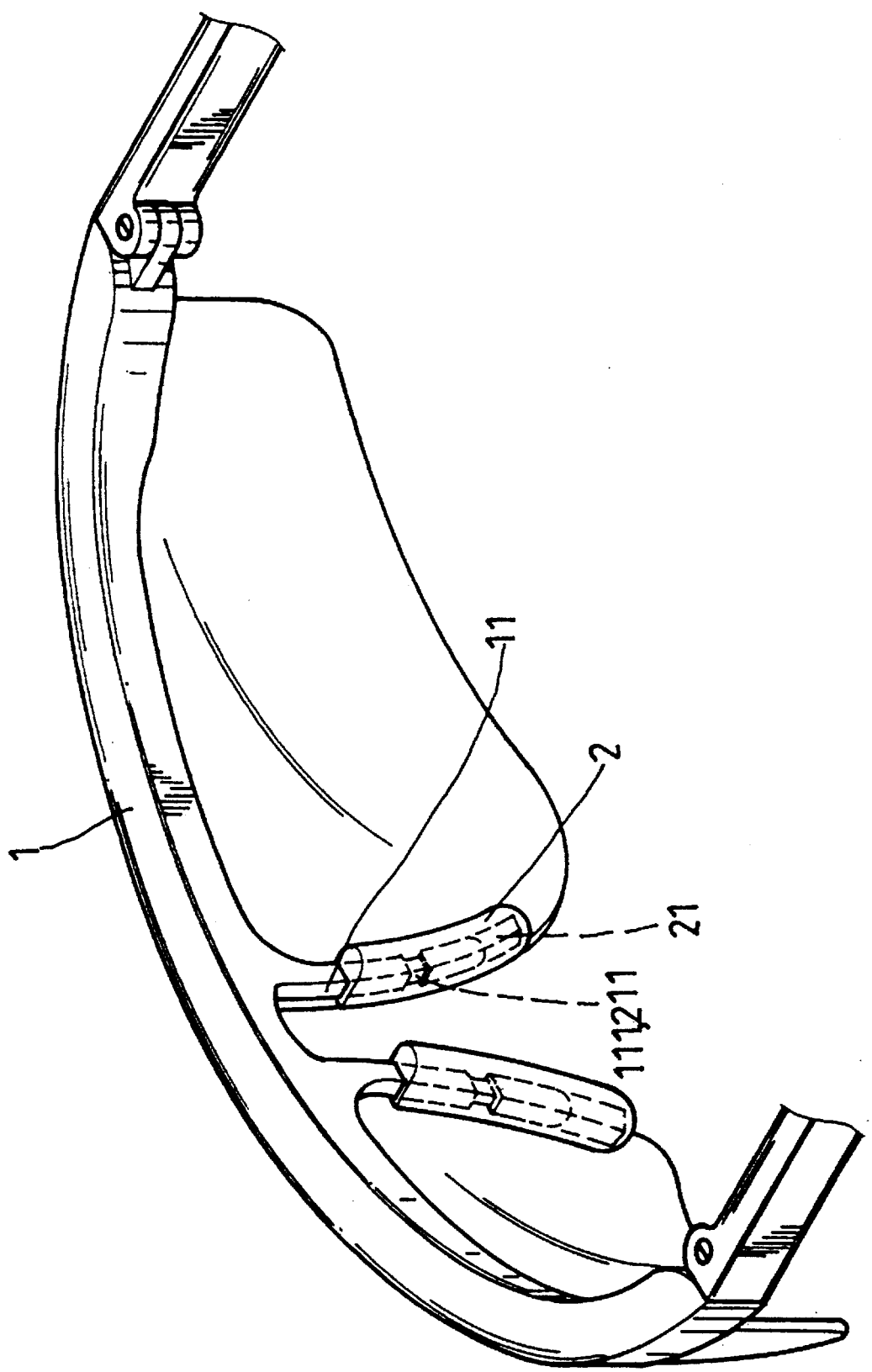
FIG. 3 is a perspective view of the present invention.
Figure 4:
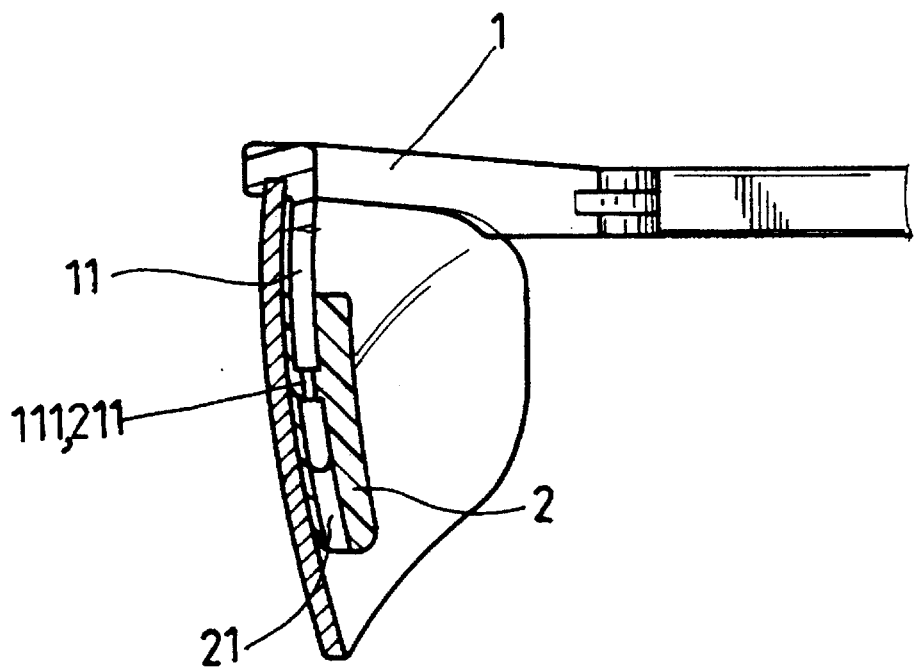
FIG. 4 is a side elevational view of the present invention, having partially sectioned.
Figure 5:
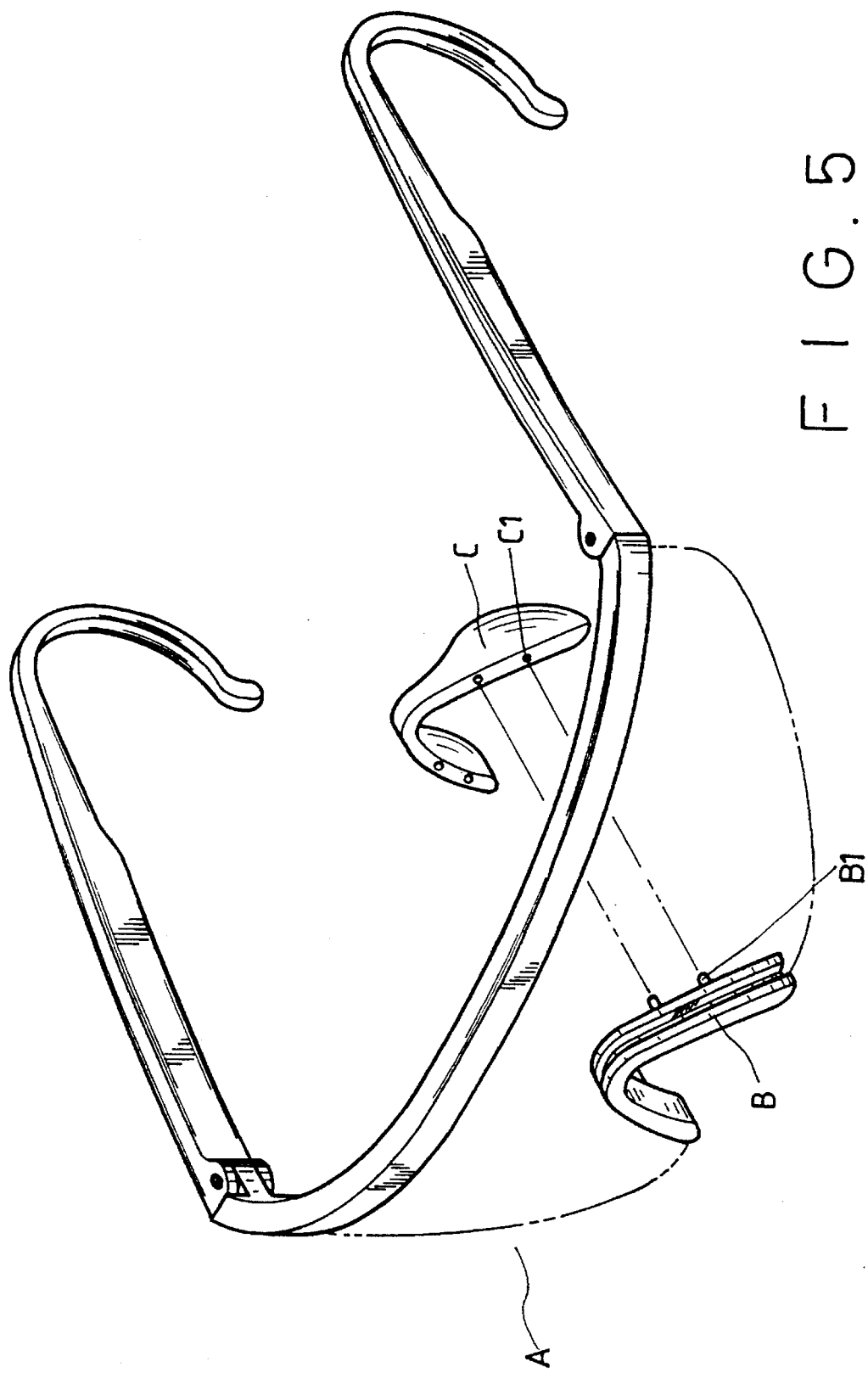
FIG. 5 is a perspective view of a conventional sun spectacles.

To assemble the present invention, as shown in FIGS. 3 and 4, the passages 21 of the pad bridges 2 are sleeved over the joint brackets 11 of the spectacle frame 1 with the bulged circular ring 211 sleeved on the circular recess 111 which causes expansion of the circular ring 211 due to its flexible character and produces a friction between the two parts. The present invention is designed to secure the pad bridges 2 on the joint brackets 11 simply by the friction of the flexible material.

I claim:

1. A pad bridge frame of spectacles having two joint brackets formed on the spectacle frame for connection of a pair of pad bridges sleeving thereon, and the improvements comprising:

said joint brackets being extending from said spectacle frame downwardly and outwardly and shaped to fit a human's nose and having a pair of circular recesses, respectively;

said pad bridges being a pair of strip blocks having a passage extending along the axis and a bulged circular ring extending within said passage having a smaller diameter than that of said passage, whereby said pad bridges sleeving over said joint bracket of said spectacle frame, and with said bulged circular ring inserting into said circular recess of said joint bracket for setting on.

2. A pad bridge frame of spectacles, as claimed of claim 1, said pad bridge being a whole body in that a tie portion connects two pad bridges together.

* * * * *